United States Patent Office 2,775,909
Patented Jan. 1, 1957

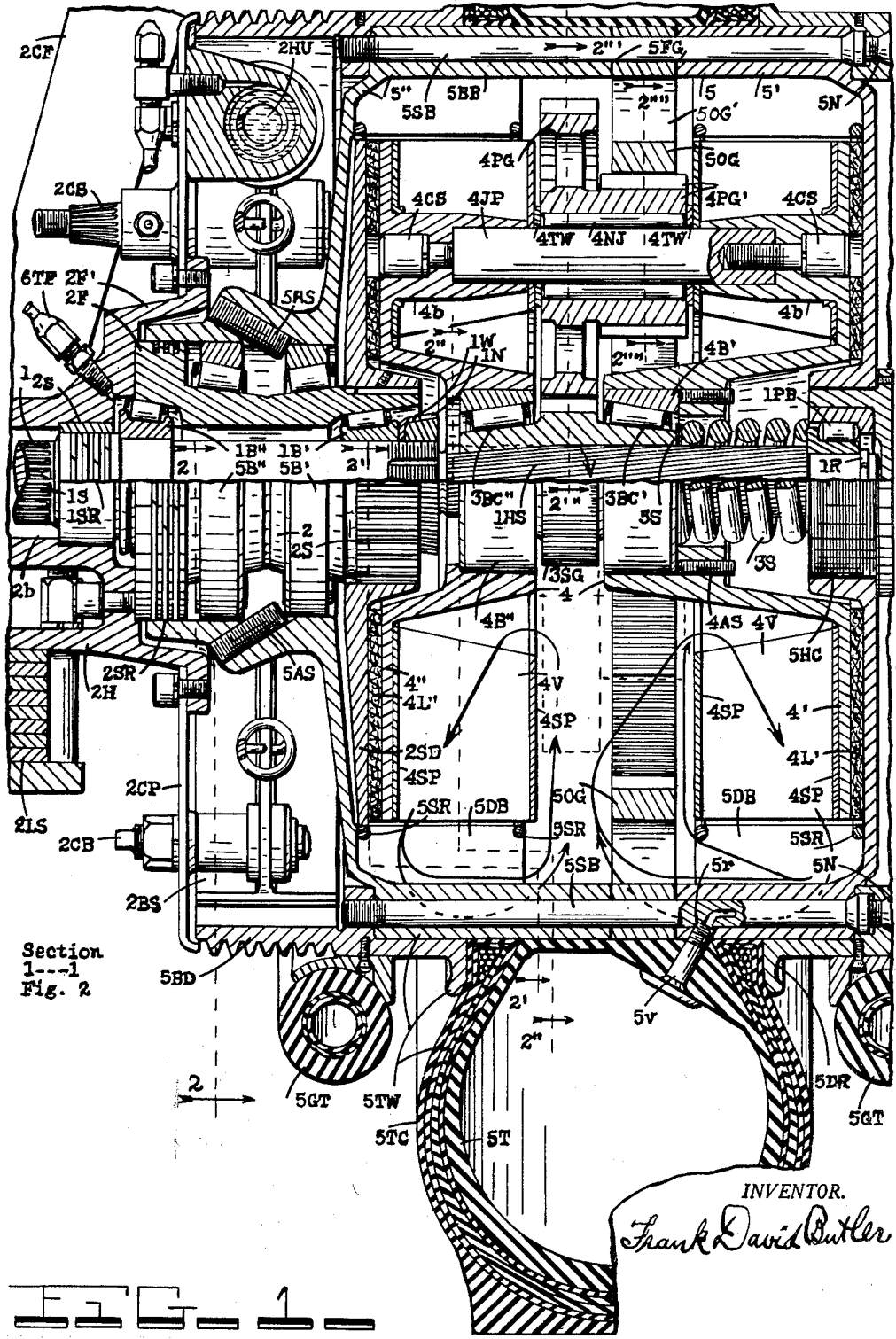

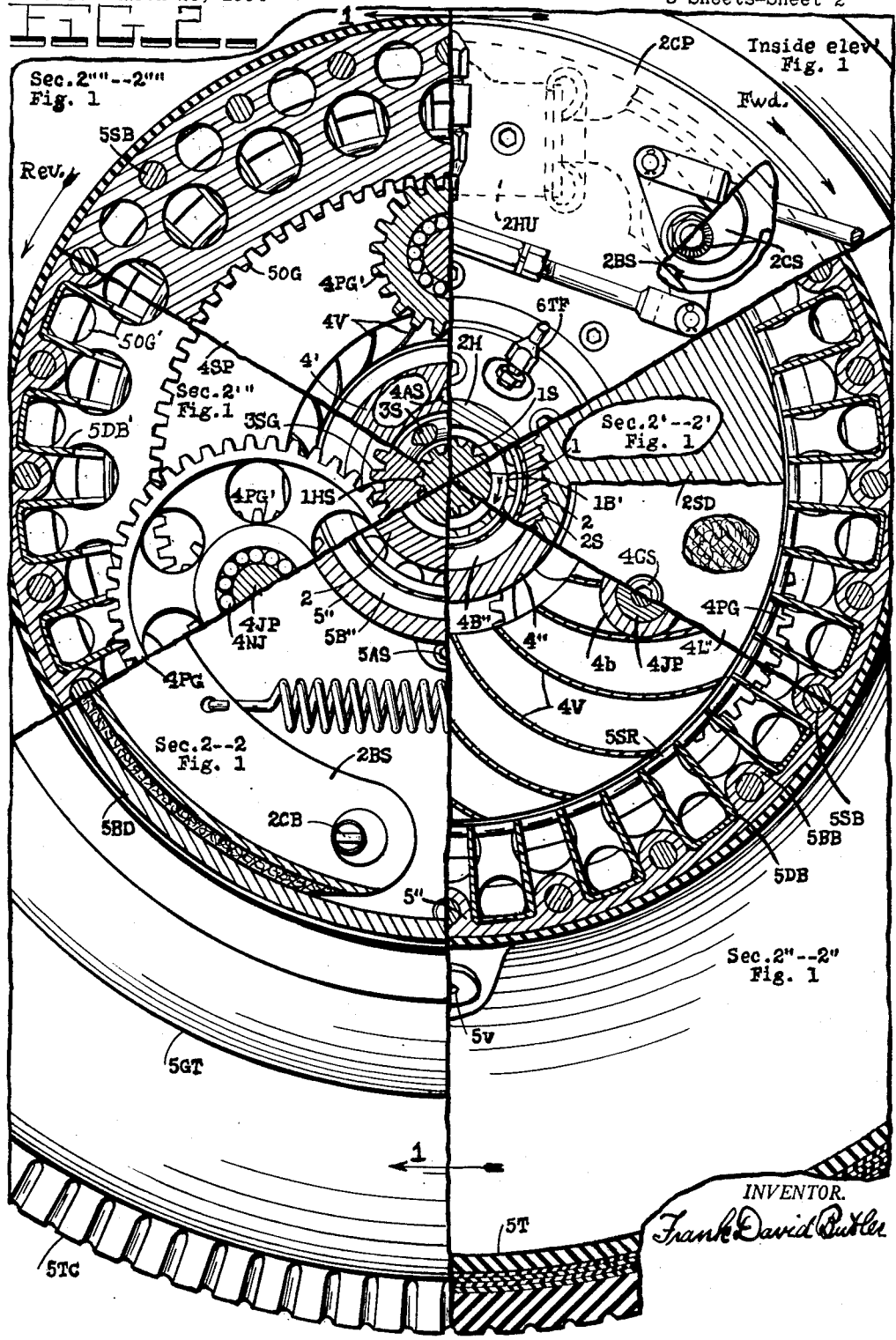

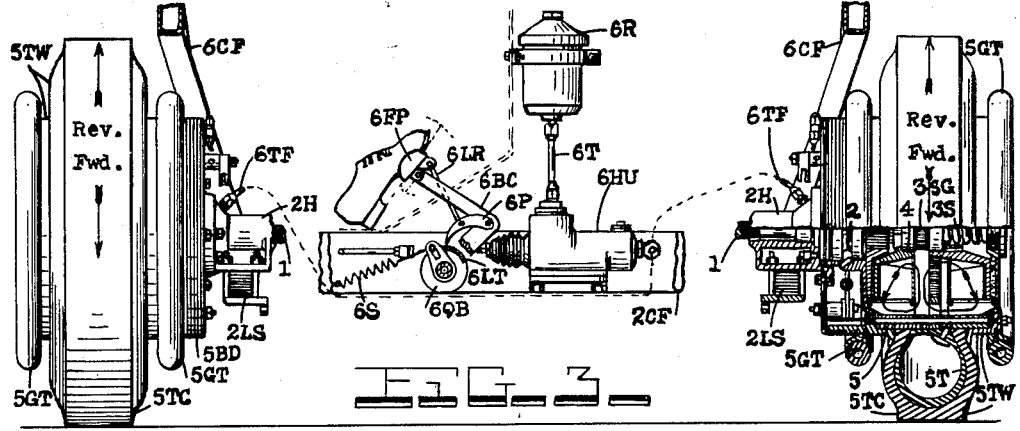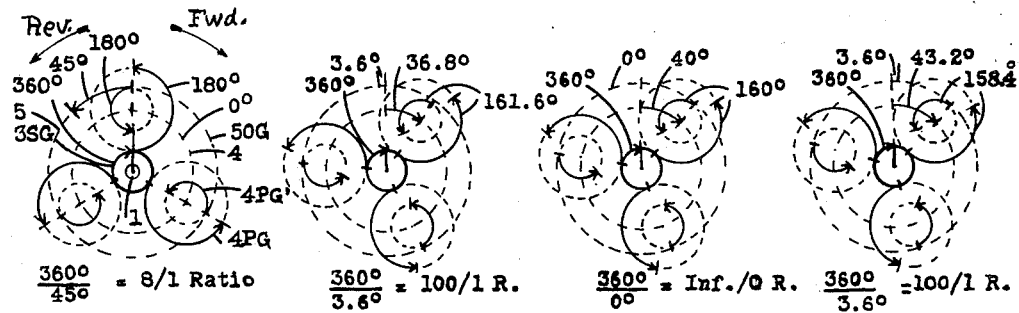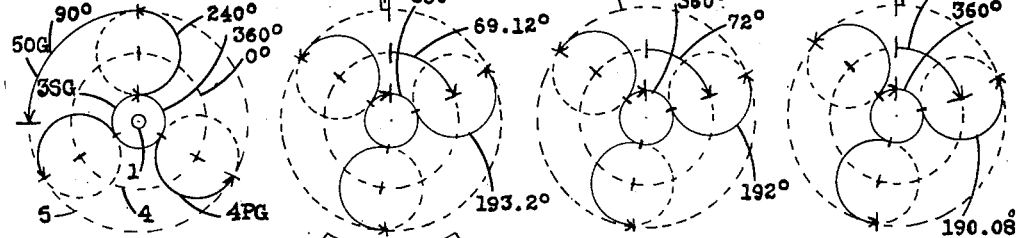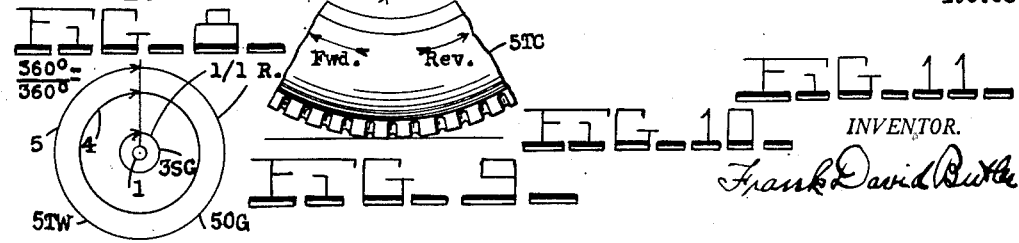

2,775,909

COMBINED HYDRODYNAMICAL AND COMPOUNDED PLANETARY GEARING DRIVEN, INTERNAL FLUID PRESSURE AXIALLY OPPOSITELY ACTUATED AND CONTROLLED, DUAL FLOW TYPE OF VARIABLE REVERSIBLE TRANSMISSION COUPLER

Frank David Butler, Venice, Calif.

Application March 23, 1954, Serial No. 418,106

9 Claims. (Cl. 74—731)

My present invention relates to improvements in combined hydrodynamical and planetary gearing driven, externally controllable fluid pressure variable and reversible, transmission couplers, wherein each coupler of a pair is adapted to form the respective hub proper of one of a pair of opposite traction wheels of an automotive vehicle. In such type of coupler, the major objects of my improvements include the provision and combination therein of: a one direction rotative helically splined driving shaft over which an elongated sun-gear, rotatively supporting a combined planet-gear-carrier and fluid impeller, is axially slidable and, during the period such shaft is rotatively driving such sun-gear, results in the latter and such combined carrier being axially displaced, in one direction within and clutched, against a hydrodynamically driven closed fluid receptacle casing of such coupler; means, operative during the period such sun-gear is rotatively driving said shaft through such helical spline, whereby such sun-gear and carrier are axially displaced, in the opposite direction within such driven casing, and results in such carrier being braked against an adjacent braking surface of a stator projecting a predetermined distance within such driven casing; means, actuated by a resilient coil spring mounted over said shaft, whereby said sun-gear and carrier are provided with an initial axial displacement thrust towards and against said stator braking surface during relatively low or nill rotation of such shaft; means, actuated jointly by said helical spline, and the hydrodynamical pressure normally generated within such type of coupler, for progressively applying the clutching between said carrier and driven casing, as combined with an externally controllable fluid pressure means for variably bolstering and controlling such clutching; means, initially actuated by said coil spring and progressively jointly actuated by said generated hydrodynamical pressure, for applying such braking between said carrier and said stator, as combined with said externally controllable fluid pressure means for variably bolstering and controlling such braking therebetween; means for tandem compounding each of a series of symmetrically spaced planet-gears so as to dual copound the planetary gearing of such coupler; means for providing said carrier with a pair of rows of convex, helically axially extending, fluid impelling vanes wherein each row of vanes is fabricated between a pair of annular shaped shrouding plates and is removable from said carrier as an interchangeable assembly with an oppositely located coupler, and wherein each such assembly is provided to be rotatively driven by a series of symmetrically spaced elongated planet-gear journal pins, and also wherein the helical vanes of one such assembly is arranged in opposite herringbone manner in relation to the helical vanes of the mate assembly; means for providing said driven casing with a pair of rows of curved semi-axially and radially extending buckets wherein each row is fabricated between a pair of annular shaped shrouding strips and is removable from said driven casing as an interchangeable unit with its mate row unit, and wherein each unit is rotatively driven by a series of symmetrically spaced elongated clamping bolt bosses which latter are integral with and extend axially throughout said driven casing; means, of co-operation between said pair of rows of fluid impelling vanes and said pair of rows of curved buckets, for providing such coupler with opposing balanced dual type fluid flow; means for rotatively journalling said shaft within a pair of opposing tapering adjustable roller bearings forming a part of and supported within said stator; means for rotatively journalling said driven casing upon a pair of opposing tapering adjustable roller bearings forming a part of and supported upon said stator; means for providing said sun-gear integral with a pair of tapering opposed roller bearing cones which latter form the journals upon which said carrier is rotative astride of such sun-gear; means for adjusting the last mentioned roller bearings; means for axially adjusting said coil spring; a pair of bonded friction linings with one located at each axial end of said carrier; and, means of applying such coupler as forming the hub proper of a traction wheel of an automotive vehicle.

Other minor improvements forming a part of or directly connected to and operative with said coupler will be progressively disclosed as the specification continues.

With reference to the several drawings forming a part hereof: Fig. 1 is a longitudinal section jointly in elevation of a preferred embodiment of my improved transmission coupler as formed within the hub proper of an automotive vehicle traction wheel, and as such coupler wheel assembly would appear on the dotted and broken line 1—1 of Fig. 2; Fig. 2 comprises several transverse sections and one end elevation of the coupler illustrated in Fig. 1, and wherein the right upper 60 degrees is an end elevation of a portion of Fig. 1, the left lower 60 degrees is as on the dotted line 2—2, the right intermediate 60 degrees as on the dotted line 2'—2', the right lower 60 degrees as on the dotted line 2"—2", the left intermediate 60 degrees as on the dotted line 2'''—2''', and the left upper 60 degrees as on the dotted line 2''''—2'''' of said Fig. 1; Fig. 3 is a diagrammatic sketch illustrating the method and means of variably supplying fluid under pressure to a pair of my couplers with one of the latter located in each of two oppositely located traction wheels of an automotive vehicle; Figs. 4 to 7 inclusive are diagrammatical sketches illustrating the rotation of the various elements within the dual compounded coupler under different conditions of operation; Figs. 8 to 11 inclusive are similar diagrammatic sketches illustrating the rotation of the various elements within the simple geared coupler during similar conditions of operation and for comparing purposes; and, Fig. 12 diagrammatically illustrates the rotation of the elements in either type of coupler operating under a 1 to 1 gearing ratio.

With further reference to the drawings, similar symbols represent and indicate similar parts in the several views and figures: the symbol 1 indicates an elongated, externally helically splined, rotatable axle-shaft, that may preferably be driven by a combustion turbine motive power assembly similar to my patent Serial No. 2,746,248 patented May 22, 1956 and provided with a one direction rotative rotor in tandem with the driving gear of a multiple geared shaft speed reducing means, and wherein such splined shaft is rotatively journalled concentrically within the flanged elongated tubular stator member 2 upon the opposed pair of adjustable tapering roller bearings 1B' and 1B'' provided with the tongued locking washer 1W and adjacent adjustment nut 1N. A series of piston-ring-type of non-rotative fluid seal rings 1SR are provided to each fit within a suitable groove, within an enlarged portion of said shaft 1, at a location within the cylindrical sleeve 2s which latter is pressed into the bore 2b of the flanged portion 2F' of the axle housing 2H, and which seal rings 1SR prevent fluid leakage along said shaft 1 at such location. The shaft 1 is also provided with an elongated helically splined portion 1HS over which the elongated sun-gear 3SG is slidable axially and is coaxially rotatable therewith, and which spline is located intermediately to the roller bearings 1B' and a pilot roller bearing assembly 1PB which latter rotatively supports the outer end of the halved type of concentrically rotatable combined orbit-gear-carrier and dual row bucketed closed fluid receptacle casing 5, which latter forms the gearing and hydrodynamically driven member of the coupler. Said sun-gear 3SG is provided with a pair of integral opposed roller bearing cones 3BC' and 3BC" with one located on each side thereof, and which cones form journals for the pair of opposed tapering roller bearings 4B' and 4B" respectively which latter rotatively support the planet-gear-carrier 4 astride of such sun-gear. Said carrier 4 is of a halved type of concentrically rotatable combined dual-row-vaned fluid impeller and planet-gear-carrier which forms the intermediate and hydrodynamical driving member of the coupler, and is slidable axially with said sun-gear 3SG and wherein a series of symmetrically arranged socket headed type of screws 4AS are provided in the hub of the outer one-half 4', of said carrier 4, for adjusting said roller bearings 4B' and 4B". An elongated resilient type of coil spring 3S is mounted over shaft 1 between said sun-gear 3SG and the inner race of said pilot bearing 1PB and provides said sun-gear 3SG and said intermediate member 4 with an initital axial thrust to the left Fig. 1 towards the flanged stator disc 2SD and causes the bonded friction lining 4L", at one end of the half 4" of the intermediate member 4, to contact brake against the adjacent stator disc 2SD, thereby resulting in tending to stop the rotation of said member 4 and to simultaneously reverse the direction of rotation of the driven member 5 through compounded planetary gearing action, as illustrated in Figs. 4 and 8. During the period the shaft 1 is rotatively driving the sun-gear 3SG, the helical spline 1HS of shaft 1 provides the sun-gear 3SG, and including said intermediate member 4, with an initial axial displacement to the right Fig. 1 towards said outer end of said driven member 5 and causes the bonded friction lining 4L', at the outer end of the half 4' of said intermediate member 4, to contact against said driven member 5, thereby tending to collapse the resilient spring 3S and resulting in equalizing the rotation speeds of members 4 and 5 and, during the period the sun-gear 3SG is rotatively driving the shaft 1 through said spline 1HS, such sun-gear, and including said intermediate member 4, are provided with an initial axial thrust to the left Fig. 1 and results in said intermediate member contact braking against said stator disc 2SD in parallel with the similar braking produced by said resilient spring 3S.

In construction, the elongated shaft 1 is provided with: the splined end 1S to be rotatively driven by a motive power means; the enlarged boss provided with said series of seal rings 1SR; the pair of opposed tapering adjustable roller bearings 1B' and 1B" provided with the tongued washer 1W and adjustment nut 1N; the elongated helically extending external spline 1HS over which the elongated internally splined sun-gear 3SG is axially slidable; the pilot bearing assembly 1PB supporting the outer end of said driven member 5; and, the snap type of retainer ring 1R for retaining bearing 1PB. The elongated tubular stator member 2 is provided with: an enlarged flanged end 2F which is bolted and rabbet jointed together with the adjacent flanged end 2F' of the combined motive power means casing and axle housing 2H; a series of piston ring type of fluid seal rings 2SR located in suitable grooves in the periphery of said flange 2F and rotatable with the hub of the half 5" of said driven member 5; a pair of opposed tapering externally extending roller bearing cones forming journal supports for the roller bearings 5B' and 5B" of the driven member 5; a pair of opposed tapering internally extending roller bearing cups forming journals for the roller bearings 1B' and 1B"; and, an elongated external, axially extending, shouldered spline 2S for supporting the flanged stator disc 2SD. The elongated tubular axle housing 2H is provided with: the flanged end 2F' to which said stator flange 2F is bolted and to which the halved type of brake-drum cover-plate 2CP is shouldered and bolted, and through which flange, fluid under a variable pressure is introduced into the coupler proper through the tubing connection fitting 6TF; the bore 2b wherein the sleeve 2S is pressed and shouldered; and, an integral bracket for supporting the multiple leafed spring 2LS which latter in turn supports the car frame 2CF. The halved type of cover-plate 2CP is removable with the coupler in place and is provided with: an integral boss in each half for support of the brake-shoe adjustment cam-bolts 2CB; an integral boss in each half for support of the brake-shoe mechanically operating cam-shafts 2CS; and, bolting support means for the hydraulic unit 2HU for operating the pair of brake-shoe halves 2BS within the brake-drum 5BD.

The halved type of combined fluid impeller and planet-gear-carrier 4 is provided with: a series of relatively large diameter planet-gears 4PG which are symmetrically spaced about and mesh with said sun-gear 3SG and are each integral in tandem and coaxially rotatable with a relatively small diameter planet-gear 4PG' which latter each form a dual compounding means and mesh with a relatively large diameter internally toothed orbit-gear 5OG which latter is carried by said driven member 5; a series of elongated cylindrical journal pins 4JP, one for each tandem pair of such planet-gears and each provided to be a press-fit within a pair of cylindrical bosses 4b with one of the latter in each half 4' and 4" of such member 4 and wherein such pins are each retained securely within said bosses and said halves are simultaneously secured together by the series of pairs of sunken headed cap-screws 4CS with one pair of the latter for each journal pin 4JP; a series of elongated cylindrical needle journals 4NJ with one set for each tandem pair of planet-gears and each set provided with a pair of thrust washers 4TW; a pair of opposing rows of series of convex helically extending fluid impeller vanes 4V arranged in herringbone relation one row to the other and with each row fabricated between a pair of annular shaped shrouding plates 4SP which latter form each such row into an assembly rotatively driveable by the series of journal pins 4JP and removable from and interchangeable between oppositely located coupler wheel assemblies; means for rotatively journalling such member 4 astride of the elongated sun-gear 3SG on the pair of opposed tapering adjustable roller bearings 4B' and 4B" and which means includes the series of symmetrically spaced socket type of adjustment screws 4AS; and, a pair of annular shaped friction linings 4L' and 4L" which may be in segmental form and are bonded respectively to the end faces of the halves 4' and 4". The halved type of combined closed fluid receptacle casing and dual row bucketed orbit-gear-carrier 5 is provided with: a pair of opposed tapering adjustable roller bearings 5B' and 5B" which are pressed within a hub portion of the casing half 5" and are provided with a series of symmetrically spaced socket type of adjustment screws 5AS; a pair of rows of series of curved axially extending fluid impelled buckets 5DB with each row fabricated between a pair of annular shaped shrouding rings 5SR which latter form each such row of buckets into a unit each of which is removable and interchangeable and both of which are driveable by a series of symmetrically spaced stud-bolt bosses 5BB extending axially within and integral with the halves 5' and 5" of said member 5; a series of elongated collared stud-bolts 5SB which extend throughout such bosses of such halves and retain the latter together with the orbit-gear 5OG, including its pair of flanking copper gaskets 5FG, clamped intermediate to such halves, and which stud-bolts are each shouldered against the half 5' and are threaded into the flanged annular shaped brake-drum 5BD, which latter is provided with the demountable pneumatic guard tube 5GT, and wherein one of such stud-bolts is drilled to form an access through which to inflate and deflate the inner tube 5T of the pneumatic tire casing 5TC which latter is mounted over the periphery of the halves 5' and 5" and forms the traction means of the traction wheel assembly 5TW; an annular shaped demountable rim 5DR secured to the half 5' by the series of conical nuts 5N of said stud-bolts 5SB and which rim is provided with the demountable pneumatic guard tube 5GT which latter is jointly for preventing the casing 5TC from striking high curbs and for preventing excessive damage to such casing 5TC in case of punctures; means in the form of an obliquely extending cylindrical recess 5r located in the periphery of the half 5' and forming an access for the insertion of the valve 5v of said inner tube 5T and through which the latter may be either inflated or deflated; means for draining and venting such casing 5, not illustrated; and, a threaded hub-cap 5HC through which to adjust the resilient spring 3S through the half 5', and by increasing or decreasing the number and thickness of the shims 5s.

With reference to the diagrammatic sketch Fig. 3, a manually operable means is illustrated and provided for applying fluid under a variable pressure within the driven members of a pair of oppositely located transmission couplers of this type as applied in forming the hubs proper of two oppositely located traction wheels of an automotive vehicle, and such variable fluid pressure supply means comprises: a vented reservoir 6R preferably located at a relatively high level so as to provide a static head upon the initial supply of reserve fluid; a common master hydraulic brake-cylinder type of manually operable hydraulic pressure unit 6HU connected to reservoir 6R with the tubing connection 6T and to the two couplers via the tubing and fitting connections 6TF, and which hydraulic unit is variably operable through oscillation of the bell-crank 6BC which latter is pivoted in the quadrant bracket 6QB which latter is provided with a series of latching teeth 6LT; a tiltable foot-pedal 6FP pivoted to the end of crank 6BC and forming a means through which to latch the latter in any position through the link-rod 6LR and latching pawl 6P; and, a resilient coil spring 6S for retracting the crank 6BC.

The combined manually and hydraulically operable brake-shoe halves 4BS may be operated jointly by a variable fluid pressure means similar to that for operating the fluid pressure means for the couplers, and wherein a pull-rod operates in tandem with the plunger of the master hydraulic unit 6HU, for operating the brake cam-shafts 2CS.

In the compounded planetary geared coupler as illustrated in Figs. 1 to 7 inclusive, the orbit-gear 50G is provided with a plurality of rows of series of symmetrically spaced access holes 50G' through which fluid will circulate and which act in the capacity of driven buckets in, as well as accesses through, such orbit-gear. Also in such type coupler whenever there is sufficient space between the path of travel of the planetary gears 4PG and the stud-bolt-bosses 5BB, a row of series of relatively short driven buckets 5DB', which are each dove-tailed in between adjacent bosses 5BB, may be provided as illustrated in the left intermediate 60 degrees of Fig. 2. In the simple planetary geared coupler as diagrammatically illustrated in Figs. 8 to 11 inclusive, there would be no need of the access holes 50G' and relatively short driven buckets 5DB' inasmuch as the gearing train consists of the sun-gear 3SG, the series of planet-gears 4PG and the relatively large diameter orbit-gear 50G, with no available space for such holes and buckets.

Figs. 4 to 7 inclusive apply only to the compounded type of geared transmission coupler and Figs. 8 to 11 inclusive apply only to the simple geared type, while all Figs. 4 to 12 inclusive illustrate the relative rotation of the rotatable elements of the couplers during 360° of rotation of their respective sun-gear 3SG under different conditions of coupler operations. In such figures, the compounded geared coupler is illustrated, for convenience, as having a normal gearing ratio of 8 revolutions of the sun-gear 3SG to 1 revolution of the orbit-gear 50G, while the simple geared coupler is illustrated as having a normal gearing ratio of 4 revolutions of sun-gear 3SG to 1 revolution of the orbit-gear 50G. However, both types of geared couplers accommodate an automatic gearing ratio range extending between infinity revolutions of sun-gear 3SG and carrier 4 to zero revolution of carrier 5, to a 1 to 1 gearing ratio of said sun-gear 3SG with carriers 4 and 5, and wherewith the use of either type in an automotive vehicle, no overdrive would be required as such 1 to 1 gearing ratio would be available.

To simplify understanding of the diagrammatic sketches Figs. 4 to 12 inclusive, the following data are provided: each time the planet-gear-carrier 4 is rotated one complete revolution by the predetermined gearing ratio revolutions of the sun-gear 3SG, and with the orbit-gear 50G stopped, the planet gears 4PG are carried through 360° of arc, thus the resulting gearing ratio formula in rotative travel of the carrier 4 to that of sun-gear 3SG becomes—one÷(gearing ratio plus one); while each time the carrier 4 is rotated one complete revolution with the sun-gear 3SG stopped, then the resulting formula in rotative travel of the carrier 4 to that of the orbit-gear 50G becomes—gearing ratio÷(gearing ratio plus one); and, thus it is apparent how a 1 to 1 ratio between the sun-gear 3SG and the orbit-gear 50G can be attained by synchronizing the speeds of rotation of the carriers 4 and 5 during their simultaneous rotation, and it is further apparent how progressive changes in the operating gearing ratios are automatically accomplished as the traction wheel starts rotating.

It is worthy of note that in the majority of automotive vehicles equipped with hydrodynamic couplers, that the usual tendency is for the vehicle to crawl ahead while it is stopped and the motive power means is idling. Such crawling ahead is due to hydrodynamical drag between the hydrodynamical driving and hydrodynamically driven members of such couplers and is not applicable in my transmission coupler, due to the slight initial thrust of the carrier 4 against the stator disc 2SD at idling speeds, and as described more in detail hereinafter.

During such periods as when the coupler sun-gear 3SG is rotating at or below the idling speed of the motive power means, the resilient spring 3S retains the intermediate member 4 initially braked relatively gently against the stator disc 2SD, and if fluid under a variable pressure is supplied to within the driven member 5, from the hydraulic unit 6HU at such time, the member 4 will be slowed down or its rotation stopped depending upon such pressure applied and will result in the orbit-gear-carrier 5 reversing in rotation as illustrated in Figs. 4, 5, 8 and 9. However, whenever the helically splined shaft 1 is rotating above such idling speed and is under a load, then the helix angle of such spline will cause the sun-gear 3SG to be initially actuated to the right Fig. 1 and to thereby overpower the resilient spring 3S and will result in the intermediate member 4 being clutched against the closed end of the driven member 5 and will thereby tend to synchronize the rotation of the members 4 and 5. In the event that fluid under a variable pressure is supplied internally to the driven member 5 at such time, then such synchronization of the rotation of members 4 and 5 will be bolstered and accelerated, and substantially no hydrodynamical slippage will occur between such rotating members. Regardless of such application of such variable fluid pressure at such time, as the speed of rotation of the members 4 and 5 progressively increases, so also does the mean effective pressure on the fluid within the driven member in proportion to such increase in speed, and which mean effective pressure also bolsters and accelerates the clutching between such members 4 and 5 in parallel with such helical spline actuating means producing such clutching and also in parallel with such variable fluid pressure means if it is being applied. The mean effective pressure mentioned is the mean pressure existing between a possible vacuum along the axis of rotation of the rotative elements of the coupler and an extremely high pressure within the periphery of the driven member 5 of such coupler, and depending upon the peripheral speed of rotation of such elements.

At such times as when the motive power means is abruptly reduced in rotative speed, or at such times as when the automotive vehicle is coasting, the sun-gear 3SG will then be driving the shaft 1 through the helical spline 1HS, and due to said helix angle of said spline, said sun-gear 3SG will be actuated to the left Fig. 1 in parallel with said spring 3S actuating means, and will result in said intermediate member being braked against said stator disc 2SD and will thereby tend to simultaneously slow down the rotation of members 5 and 4 and will thus produce a means of power braking the rotation of the traction wheel 5TW.

With reference to Fig. 1, in reviewing the unique features of the transmission coupler as a whole, particular attention should be accorded the following: the full-floating adjustable journalling of the rotative shaft 1 and carriers 4 and 5; the manner in which dual oppositely symmetrically axially balanced fluid flow, as diagrammatically illustrated, is accomplished within the carriers 4 and 5; the relatively simple method of accomplishing tandem dual compounding of the planet-gears of the planetary gearing means comprising the sun-gear 3SG, the series of symmetrically spaced tandem compounded planet-gears 4PG and 4PG', and the orbit-gear 5OG; the axially adjustable spring 3S providing an actuating means for producing initial axial braking to the left between carrier 4 and the stator disc 2SD; the helical angle of the spline 1HS for providing an actuating means for producing axial clutching to the right between the carriers 4 and 5 and/or producing axial braking to the left between carrier 4 and said stator disc 2SD depending upon predetermined conditions of coupler operation; the interchangeable shrouded fluid driven bucket units 5DB; the interchangeable shrouded fluid driving vane assemblies 4V; the halving of the carriers 4 and 5; the halving of the detachable cover-plate 2CP supporting the brake-shoe halves 2BS; the annular shaped flanged brake-drum 5BD detachable from carrier 5 and forming a portion of the pneumatic tire rim integral therewith; the detachable mounting of the pneumatic tire casing and tube over the periphery of the carrier 5; the insertion of the inner tube 5T inflation valve 5v in the recess 5r in the periphery of the carrier 5 so that such tube may be inflated and deflated using a closed end elongated resilient spring, not illustrated, extending from the inflation means through the access hole in one of the studbolts 5SB; and, the unique pneumatic guard tubes 5GT wherein the outer one of the latter acts in the capacity of a squealer ring whenever the outer side of the traction wheel 5TW contacts a relatively high street curbing or similar object.

The entire coupler wheel assembly is interchangeable from one side of an automotive vehicle to the other with the exception of the helically splined shaft 1 and helically splined sun-gear 3SG which jointly form right and left replacement units for such type of coupler. Otherwise such complete transmission coupler wheel assembly may be used as a replacement assembly by garages.

Other than the transmission means contained within and the clutching and braking applicable internally to the coupler, no other clutching or transmission means need be applied intermediately to either of two oppositely located coupler traction wheel assemblies of this type and the motive power means, and whenever the latter forms an integral portion jointly with the axle-shaft housing 2H, then the entire combined assembly may be carried by garages as a complete replacement assembly that may be interchanged in less than an hour's time by conveniently rolling one assembly out and the other replacement assembly in under the automotive vehicle upon the pair of oppositely located traction wheels of such assembly.

Having fully described my invention in its preferred embodiment in forming the hub of a traction wheel of an automotive vehicle, I define its unique improvements in the following appended claims:

I claim:

1. In a combined hydrodynamical and compounded planetary gearing driven, externally applied internal fluid pressure variable and reversible transmission coupler applicable as forming the hub proper of a traction wheel and equipped with a one direction rotatable elongated internally splined, sun-gear slidable axially upon an elongated shaft and forming the gearing driving member, an elongated coaxially rotatable and slidable combined dual row vaned fluid impeller and planet-gear-carrier forming the hydrodynamical driving and intermediate member, an elongated concentrically rotatable combined orbit-gear-carrier and dual row bucketed closed fluid receptacle casing forming the gearing and hydrodynamically driven member and having a closed end, an elongated flanged tubular stator member projecting a predetermined distance within the inner end of said driven member and having a flanged disc secured to its coupler end, a resilient spring interposed between the outer end of said sun-gear and a fixed bearing race secured to said shaft and wherein said spring initially axially displaces said sun-gear upon said shaft and causes said intermediate member to initially brake against said disc of said stator member, and, means for supplying fluid under a variable pressure to within said driven member, the provision and combination therein such coupler of: an elongated helical spline machined externally in said shaft and over which said sun-gear and intermediate member are jointly slidable axially and which spline, during the period it is rotatively driving said sun-gear, causes the latter and including said intermediate member to be displaced axially thereon towards the closed end of said driven member and results in collapsing said spring and causing said intermediate member to be clutched against said closed end of said driven member, and, during the period such shaft is driven by said sun-gear through such helical spline, causes said sun-gear to be displaced axially thereon towards said disc of said stator and results in said intermediate member being braked against such disc; means for progressively hydrodynamically braking said intermediate member against said disc of said stator in parallel with said resilient spring and such helically splined shaft actuating means for producing such braking; means for progressively hydrodynamically clutching said intermediate member against said closed end of said driven member in parallel with such helically splined shaft actuating means for producing similar clutching; means for applying said externally applied internal fluid pressure in a variable member to within said driven member for bolstering said braking of said intermediate member against said disc in parallel with such progressive hydrodynamical means, such helically splined shaft actuating means, and said resilient spring for producing similar braking; means for applying said externally applied internal fluid pressure in a variable manner to within said driven member for bolstering said clutching of said intermediate member against said closed end of said driven member in parallel with such progressive hydrodynamical means, and such helically splined shaft actuating means for producing similar clutching; and means for dual compounding the planetary gearing in the form of a series of tandem planet-gears symmetrically spaced about and each provided with a relatively large diameter gear meshing with said sun-gear and an integral tandem relatively small diameter gear meshing with an internally toothed relatively large diameter orbit-gear carried by said driven member.

2. A combined hydrodynamical and compounded planetary gearing driven, internally oppositely axially displaceable, variable reversible transmission coupler applicable as forming the hub proper of a traction wheel and comprising: a one direction rotatable elongated sun-gear slidable axially upon an elongated shaft and forming the gearing driving member; a halved type of elongated coaxially rotatable and slidable combined dual row vaned fluid impeller and planet-gear-carrier forming the hydrodynamical driving and intermediate member; a halved type of elongated concentrically rotatable combined dual row bucketed closed fluid receptacle casing and orbit-gear-carrier forming the gearing and hydrodynamically driven member and provided with one end closed; an elongated flanged tubular stator member projecting a predetermined distance within and provided as a means upon which to rotatively journal said driven member and within which to rotatively journal said shaft both in full-floating manner, and which stator is provided with a flanged internally splined stator disc shouldered and secured to the coupler end thereof; means for supplying fluid under a variable pressure to within said coupler; and a resilient spring means interposed between one end of said sun-gear and an adjacent fixed bearing race secured to said shaft and wherein such spring is provided for initially axially displacing said sun-gear towards said stator disc and thereby causing said intermediate member to be braked against such disc, as combined with an elongated helical spline machined externally in said shaft and over which said sun-gear and intermediate member are jointly slidable axially in either direction, and which spline forms an actuating means for producing clutching between said intermediate member and said closed end of said driven member under certain predetermined conditions of operation, and under certain other predetermined conditions of operation, produces braking between said intermediate member and said stator disc; means in the form of said dual vanes and dual buckets for progressively hydrodynamically producing clutching between said intermediate member and said closed end of said driven member, under certain predetermined conditions of operation, in parallel with said helical spline actuating means for producing similar clutching, and under certain other predetermined conditions of operation, for progressively hydrodynamically producing braking between said intermediate member and said stator disc in parallel with said helical spline actuating means and said spring means for producing similar braking therebetween; means for applying said fluid under a variable pressure to within said driven member for bolstering the clutching of said intermediate member against the closed end of said driven member in parallel with the other means mentioned for producing similar clutching under certain predetermined conditions of operation, and, under certain other conditions of operation, for bolstering the braking of said intermediate member against said stator disc in parallel with the other.

3. The coupler of claim 2 characterised by: said elongated shaft provided with said external helical spline over which said sun-gear and said intermediate member are jointly coaxially rotatable and axially slidable, and which shaft is rotatively journalled in full-floating manner within said tubular stator member, thereby forming a combination with said sun-gear and intermediate member within.

4. The coupler of claim 2 characterised by: said one direction rotatable elongated sun-gear slidable axially upon said helical spline of said shaft jointly with said intermediate member and upon which the latter is rotatively journalled astride of in full-floating manner, thereby forming a combination of such sun-gear, helically splined shaft and intermediate member within such variable reversible transmission coupler.

5. The coupler of claim 2 characterised by: said means of dual compounding the planetary gearing, of constructing each of said series of tandem planet-gears integral, with a relatively large diameter gear at one end of such tandem and provided to mesh with said sun-gear and a relatively small diameter gear at the opposite end of such tandem and meshing with an internally toothed relatively large diameter orbit-gear carried by said driven member, and of symmetrically spacing such series of tandem planet-gears about said sun-gear and of carrying them in said planet-gear-carrier, thereby forming a combination set of such compounded planetary gearing composed of one such sun-gear, a plurality of such tandem integral planet-gears and one such internally toothed orbit-gear all co-operative within such variable reversible transmission coupler.

6. The coupler of claim 2 characterised by: said dual row vaned fluid impeller to be provided with a pair of rows of convex helically axially oppositely extending fluid impeller assemblies, wherein each assembly is formed between a pair of oppositely located annular shaped shrouding plates drivable by said intermediate member and interchangeable between oppositely rotatable paired couplers, and wherein said dual row bucketed driven member is provided with each row of such buckets formed between a pair of oppositely located annular shaped shrouding rings wherein each row thereby forms a driven bucketed unit that is drivable by said driven member and is interchangeable with its mate unit and is co-operative in combination with the adjacent impeller of such variable reversible transmission coupler.

7. In a combined hydrodynamical and compounded planetary gearing driven transmission coupler of the traction wheel hub adaptable type described and equipped with: an externally variable internally applicable fluid pressure means; an elongated externally splined driving shaft rotative concentrically in one diretcion within said coupler; an elongated coaxially rotatable, internally splined sun-gear integral with a pair of oppositely tapering roller bearing cones and axially slidable in either direction over and driven by such spline of said driving shaft; an elongated, annular shaped, halved type of coaxially rotatable and coaxially slidable dual row vaned combined fluid impeller and multiple planet-gear-carrier forming the hydrodynamical driving and intermediate member and provided with a pair of friction linings with one of the latter located at each end thereof; an elongated halved type of concentrically rotatable dual row bucketed combined closed fluid receptacle casing and orbit-gear-carrier forming the gearing and hydrodynamically driven member and the hub of such traction wheel and provided with one end closed; an annular shaped internally toothed orbit-gear rotatable with said driven member; a flanged elongated tubular stator member projecting concentrically a predetermined distance within said driven member and upon and within which respectively said driven member and said shaft are full-floating journalled; an internally splined annular shaped flanged stator disc secured over the coupler end of said stator member and provided with a braking surface on one side; and, an elongated resilient coil spring mounted over said driving shaft and providing said intermediate member with an initial axial displacement braking thrust towards and against said stator disc, the combination therein and therewith of: means providing the spline of said shaft and spline of said sun-gear to each be helical in shape; an actuating means provided by the helical spline of said driving shaft while the latter is rotatively driving said sun-gear and whereby the latter and said intermediate member are axially displaced towards the closed end of said driven member and such intermediate member is clutched thereagainst; a second actuating means provided by said helical spline of said driving shaft while the latter is being rotatively driven by said sun-gear and whereby the latter and said intermediate member are axially displaced towards said stator disc and such intermediate member is braked thereagainst; the combination of said fluid pressure means with and for bolstering and controlling the first mentioned helical spline actuating means and the normal progressive hydrodynamically actuated means of such type coupler in applying such clutching of said intermediate member against the closed end of said driven member for variably rotating the latter forward, as combined with, the combination of such variable fluid pressure means for bolstering said resilient spring and second helical spline actuating means along with the normal progressive hydrodynamically actuating means of such coupler in applying and controlling such braking of said intermediate member against said stator disc for variably rotating said driven member in reverse; and, means for dual compounding the planetary gearing of such coupler by a series of relatively large diameter planet-gears symmetrically spaced about and meshing with said sun-gear and each integral in tandem with a relatively small diameter planet-gear which meshes with said orbit-gear and results in the latter normally rotating in the same direction as said sun-gear in such dual compounding means.

8. In a combined hydrodynamical and compounded planetary gearing driven, externally controllable internally applicable, fluid pressure variable and reversible transmission coupler equipped with: an elongated one direction rotatable drive shaft; an axially slidable coaxially rotatable elongated sun-gear forming the driving member; a coaxially slidable and rotatable combined planet-gear-carrier and fluid impeller forming the intermediate member; a concentrically rotatable multi-bucketed combined orbit-gear-carrier and closed fluid receptacle casing forming the driven member and having one end closed; an orbit-gear rotatable with said driven member; an elongated stator projecting concentrically within said driven member and forming the coupler support member; a stator-disc secured to the coupler end of said stator and provided with a braking surface; and, a resilient coil spring supported upon said shaft and initially axially displacing said intermediate member against said braking surface, the provision therein and therewith of: an elongated helical spline integral externally with said shaft; an elongated helical spline integral internally with said sun-gear; means actuated by such helical splines, during any period said shaft is driving said sun-gear, whereby said intermediate member is axially displaced and clutched against said closed end of said driven member and tends to synchronize the rotation of the latter and said intermediate member; means actuated by such helical splines, during the period said sun-gear is driving said shaft, whereby said intermediate member is axially displaced and braked against said stator-disc and thereby forms a power braking means; means for bolstering the first mentioned actuated means by said internally applicable fluid pressure and as may be further increased by any hydrodynamical pressure being progressively generated at the time and for clutching said intermediate member against said driven member during forward motion rotation of the coupler; means for bolstering the second mentioned actuated means by said internally applicable fluid pressure; means for bolstering the resilient spring initial braking of said intermediate member against said stator-disc by said internally applicable fluid pressure and thereby controlling the reversing of said driven member; and, means for dual compounding the planetary gearing of such coupler by a series of relatively large diameter planet-gears symmetrically spaced about and meshing with said sun-gear and each provided integral in tandem therewith a relatively small diameter planet-gear which meshes with said orbit-gear and thereby results in said orbit-gear rotating at a reduced speed and in the same direction of rotation as said sun-gear during forward rotation starting conditions.

9. In a combined hydrodynamical and compounded planetary gearing driven, externally controllable internally applicable, fluid pressure variable and reversible transmission coupler equipped with: an elongated one direction rotatable drive-shaft; an axially slidable coaxially rotatable elongated sun-gear forming the driving member; a coaxially slidable and rotatable combined planet-gear-carrier and fluid impeller forming the interemdiate member; a concentrically rotatable multi-bucketed combined orbit-gear-carrier and closed fluid receptacle casing forming the driven member and having one end closed; an orbit-gear rotatable with said driven member; an elongated stator projecting concentrically within said driven member and forming the coupler support member; a stator-disc secured to the coupler end of said stator and provided with a braking surface; and, a resilient coil spring supported upon said shaft and initially axially displacing said intermediate member against said braking surface, the combination therewith of: an elongated helical spline integral externally with said shaft; a cooperative elongated helical spline integral internally with said sun-gear; means actuated by such helical splines, during any period said shaft is driving said sun-gear, whereby said intermediate member is axially displaced and clutched against said closed end of said driven member and tends to synchronize the rotation of the latter and said intermediate member; means actuated by such helical splines, during any period said sun-gear is driving said shaft, whereby said intermediate member is axially displaced and braked against said stator-disc and thereby produces power braking; means for bolstering the first mentioned actuated means by said internally applicable fluid pressure, as combined with any hydrodynamical pressure being progressively generated within the coupler at the time, for clutching said intermediate member against said driven member during forward motion rotation of the coupler; means for bolstering the second mentioned actuated means by said internally applicable fluid pressure; means for bolstering the resilient spring initial braking of said intermediate member against said stator-disc by said internally applicable fluid pressure and thereby controlling the reversing of said driven member; and, means for dual compounding the planetary gearing of such coupler by a series of relatively large diameter planet-gears symmetrically spaced about and meshing with said sun-gear and each having integral therewith in tandem a relatively small diameter planet-gear which meshes with said orbit-gear and thereby results in the latter normally rotating in the same direction as said sun-gear and at an extremely reduced speed in relation thereto during starting conditions of operation but which gearing as combined with the hydrodynamical elements of the coupler and the clutching means described may quickly be brought into a one to one gearing ratio between the rotation of said sun-gear and the rotation of said driven member.

References Cited in the file of this patent

UNITED STATES PATENTS

| | | |
|---|---|---|
| 1,279,659 | Cottleman | Sept. 24, 1918 |
| 1,463,447 | Stahl | July 31, 1923 |
| 2,600,762 | Hartz | June 17, 1952 |